United States Patent
Miyamoto

[11] Patent Number: 6,157,043
[45] Date of Patent: *Dec. 5, 2000

[54] SOLENOID COMPRISING A COMPOUND NANOTUBE AND MAGNETIC GENERATING APPARATUS USING THE COMPOUND NANOTUBE

[75] Inventor: Yoshiyuki Miyamoto, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/995,858

[22] Filed: Dec. 22, 1997

[30] Foreign Application Priority Data

Dec. 20, 1996 [JP] Japan ................................. 8-342178

[51] Int. Cl.[7] .................................................. H01L 29/06
[52] U.S. Cl. ........................... 257/22; 257/415; 257/531; 423/445
[58] Field of Search ........................... 257/22, 415, 531; 423/445 B

[56] References Cited

U.S. PATENT DOCUMENTS

| | | | |
|---|---|---|---|
| 5,401,975 | 3/1995 | Ihara | 423/445 B |
| 5,830,326 | 11/1998 | Iijima | 423/445 B |

OTHER PUBLICATIONS

Andreas Thess et al., "Crystalline Ropes of Metallic Carbon Nanotubes", *Science*, vol. 273, Jul. 26, 1996, pp. 483–487.
Dresselhaus, *"Science of Fullerenes and Carbon Nanotubes"* Academic Press San Diego, 1995.

*Primary Examiner*—Jerome Jackson, Jr.
*Attorney, Agent, or Firm*—Sughrue, Mion, Zinn, Macpeak & Seas, PLLC

[57] ABSTRACT

A compound nanotube (17) is made of carbon nitride (CN). Another compound nanotube (19) is made of boron carbide ($BC_3$) with alkali metal doped. Each of the nanotubes has a distorted configuration of atoms in a predetermined direction with a lower symmetry than that of an undistorted configuration. A solenoid element comprises the compound nanotube. A magnetic generating apparatus comprises a compound nanotube, means for applying a tensile to the compound nanotube in a longitudinal direction of said compound nanotube, and means for flowing current at both ends of the compound nanotube. Each of the nanotubes is applied with mechanical stress to controllably vary a current flow direction. Specifically, tensile stress is applied in a longitudinal direction (21) of the nanotube so that an electric current spirally flows around a surface of the nanotube along a spiral path having a diameter of several nanometers, as shown in arrows (23). Thus, a large magnetic field is generates with weak current so that an arrangement for generating a strong magnetic field can be miniaturized.

26 Claims, 5 Drawing Sheets

○ C ATOM
● B ATOM

6,157,043

SOLENOID COMPRISING A COMPOUND NANOTUBE AND MAGNETIC GENERATING APPARATUS USING THE COMPOUND NANOTUBE

BACKGROUND OF THE INVENTION

This invention relates to a compound nanotube of a nanometer scale, a microsolenoid made of compound nanotube, and a magnetic generating apparatus for generating a large magnetic field with weak current.

As known in the art, a solenoid is an electromagnetic device which comprises a core or an air core and a conductor wire wound therearound and which is for generating a magnetic field by causing electric current to flow through the conductor wire along a spiral path.

In the prior art, however, the solenoid has a diameter on the order of millimeters at minimum. It is difficult to achieve a microsolenoid of a smaller scale.

As described above, generation of the strong magnetic field requires the large electric current and the superconducting coil is used in order to reduce power consumption. However, the use of the superconducting coil inevitably requires a cooling device and a giant power supply and makes it difficult to achieve miniaturization of the device.

Thus, the increase in scale of the electromagnetic device has been unavoidable. It is therefore difficult to put the electromagnetic device into practical use in the field of electronics other than the heavy electric industries.

SUMMARY OF THE INVENTION

It is an object of this invention to provide a solenoid which is capable of generating a large magnetic field with weak current.

It is another object of this invention to provide a solenoid having a microscopic structure of a nanometer scale.

According to one aspect of the present invention, there is provided a compound nanotube having a distorted configuration of atoms in a predetermined direction with a lower symmetry than that of an undistorted configuration.

In the aspect of the present invention, the distorted configuration of the atoms may be formed spirally along a surface of the nanotube.

According to another aspect of the present invention, there is provided a magnetic generating apparatus comprising a compound nanotube, means for applying a tensile to the compound nanotube in a longitudinal direction of the compound nano tube, and means for flowing current at both ends of the compound nanotube. In the aspect of the present invention, the current flows in a spiral direction along a surface of the compound nanotube to generate flux of magnetic field along the longitudinal direction.

In the magnetic generating apparatus, the compound nanotube may have a distorted configuration of atoms in a predetermined direction with a lower symmetry than that of an undistorted configuration.

According to still another aspect of the present invention, there is provided a solenoid element comprising a compound nanotube. The compound nanotube has a distorted configuration of atoms in a predetermined direction with a lower symmetry than that of an undistorted configuration.

In the aspect of the present invention, the distorted configuration of the atoms is formed spirally along a surface of the nanotube.

In this invention, the compound nanotube may be made of either a conductor or a semiconductor. In case of the semiconductor, an electron carrier, such as an alkali metal is preferably doped in the nanotube.

On the other hand in the case of the conductor, for example, the compound nanotube may be made of carbon nitride and the compound nanotube of a semiconductor is made of boron carbide.

The nanotube may be applied with mechanical stress to controllably vary a current flow direction, i.e., from a linear current along a tube axis to a spiral current around a tube surface. The mechanical stress may be tensile stress applied in a longitudinal direction of the nanotube. A spiral pitch (corresponding to the number of turns of a conventional coil) may be changed in dependence upon the magnitude of the stress applied to the nanotube.

In this invention, a ferromagnetic material may be filled inside the nanotube to form a core. With this structure, the intensity of the magnetic field can be increased further. The nanotube may have either a multi-layer or a single-layer structure.

According to this invention, the electric current flows along a spiral path having a diameter on the order of several nanometers. It is therefore possible to generate a large magnetic field even with the electric current as weak as about several microamperes. In addition, since the giant power supply and the cooling device in the conventional solenoid are not required, it is possible to miniaturize an arrangement for generating a strong magnetic field.

DESCRIPTION OF THE PREFERRED EMBODIMENTS:

In order to facilitate an understanding of this invention, description will at first be made as regards a superconducting coil as an example of a conventional solenoid coil.

Figure 1:
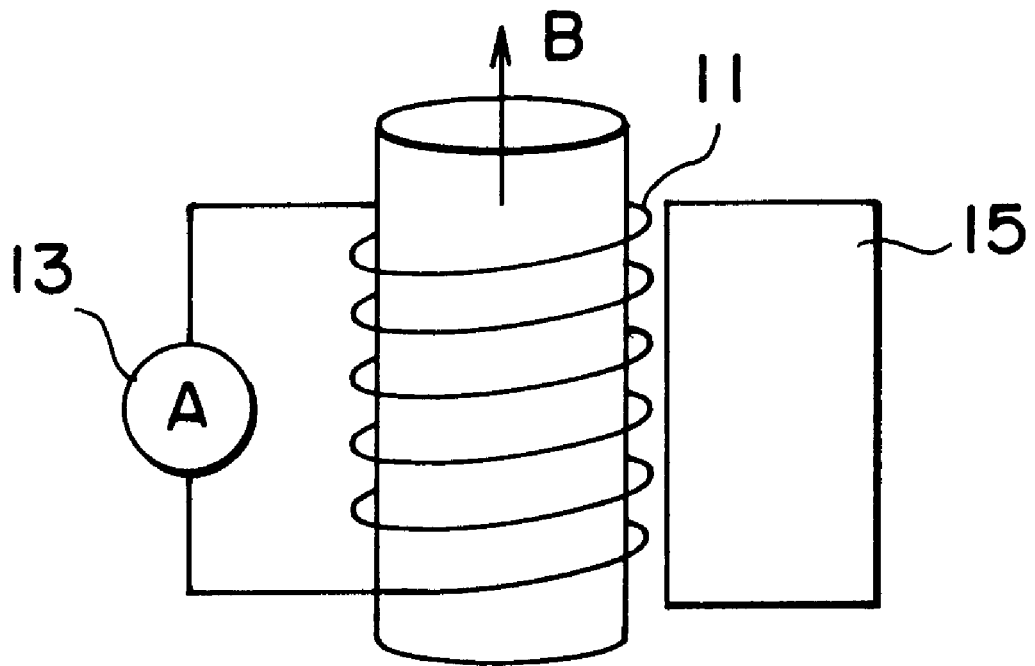
FIG. 1 is a view showing an example of a conventional solenoid.

Referring to FIG. 1, the superconducting coil depicted at 11 comprises a giant power supply 13 and a cooling device 15. An arrow B represents a direction of a magnetic field.

Now, description will be made about an embodiment of this invention with reference to the drawing.

Figure 2:
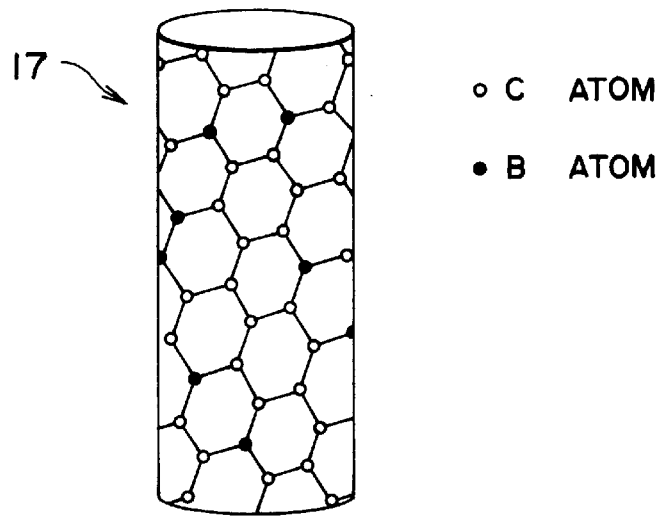
FIG. 2 is a view showing atomic configuration of a boron carbide ($BC_3$) nanotube.
Figure 3:
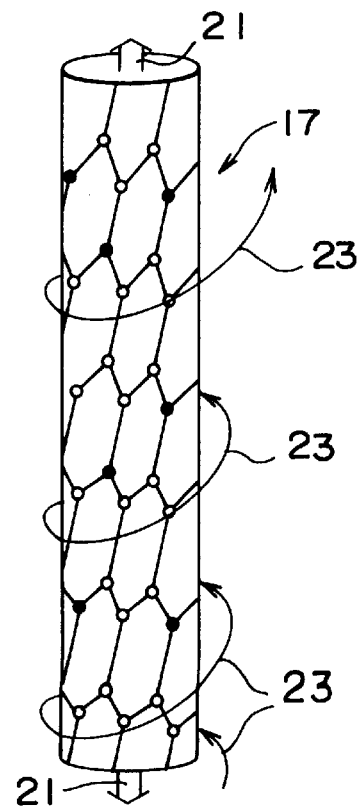
FIG. 3 is a schematic diagram showing a stress direction and a current direction for the $BC_3$ nanotube illustrated in FIG. 2.

Referring to FIGS. 2 and 3, a solenoid according to a first embodiment of this invention comprises a nanotube 17 made of boron carbide ($BC_3$) and having a spiral atomic configuration. Since such $BC_3$ compound of the first embodiment is a semiconductor with a band gap, a carrier is doped to obtain electric current. In this embodiment, an alkali metal is used as the carrier. When a small amount of alkali metal is introduced into the nanotube 17 of the $BC_3$ compound, electrons transfer or migrate from the alkali metal to the nanotube 17. The electrons which have migrated act as the carrier.

In FIG. 2, the nanotube 17 of the boron carbide ($BC_3$) with the alkali metal doped therein is kept in a natural state free from any mechanical stress. In this state, the electric current flows in a longitudinal direction of the nanotube 17.

Turning to FIG. 3, the nanotube 17 is extended in response to mechanical stress applied in the longitudinal direction 21 of the nanotube 17. In this state, the atomic configuration of a tube wall is distorted to lower or break its symmetry. The stress applied to the nanotube 17 is required to have a magnitude such that extension of the nanotube 17 corresponds to about 5% of its initial length before application of the mechanical stress. Such collapse of the symmetry transforms the tube wall into an anisotropic conductor. Thus, the electric current flows in an oblique direction 23 inclined from a direction of an electric field. When the electric field is applied in the longitudinal or axial direction 21 of the tube, the electric current flows over the tube wall in the oblique direction inclined from the direction of the electric field. Thus, the electric current flows as a spiral current. As described above, the nanotube 17 according to the first embodiment of this invention has a function of the solenoid.

Figure 4:
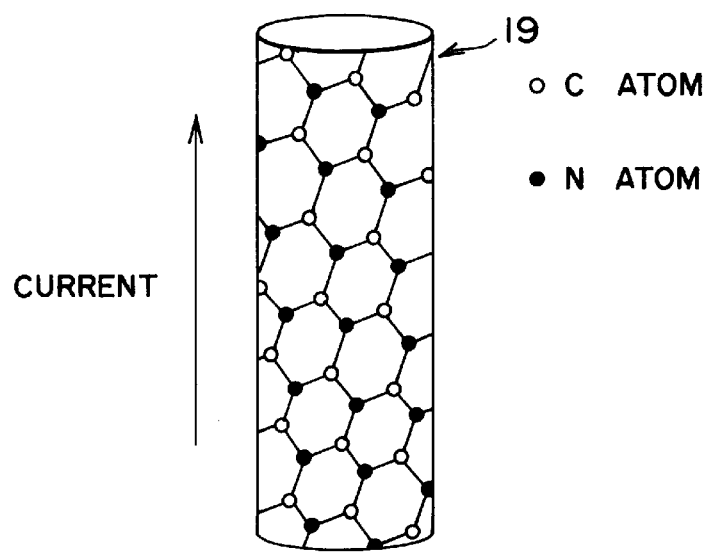
FIG. 4 is a view showing atomic configuration of a carbon nitride (CN) nanotube.
Figure 5:
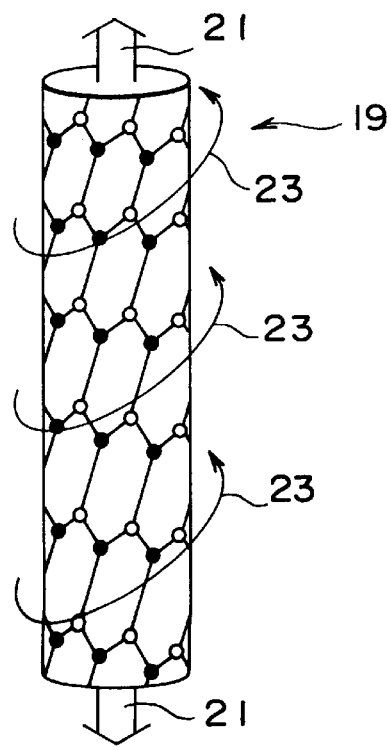
FIG. 5 is a schematic diagram showing a stress direction and a current direction for the CN nanotube illustrated in FIG. 4.

Turning to FIGS. 4 and 5, a solenoid according to a second embodiment of this invention comprises a nanotube 19 made of carbon nitride (CN) and having a spiral atomic configuration like the first embodiment. However, since CN in the second embodiment is a metallic compound, it is unnecessary to dope the carrier.

In FIG. 4, the nanotube 19 of the carbon nitride (CN) is kept in a natural state free from any mechanical stress. In this state, the electric current flows in a longitudinal direction of the nanotube 19 in the manner similar to the first embodiment.

Turning to FIG. 5, the nanotube 19 is extended in response to mechanical stress applied in a longitudinal direction 21 of the nanotube 19. In this state, the atomic configuration of a tube wall is distorted to lower or break its symmetry, as described in conjunction with the first embodiment. The stress applied to the nanotube 19 is required to have a magnitude such that extension of the nanotube 19 corresponds to about 5% of its initial length before application of the mechanical stress. Such collapse of the symmetry transforms the tube wall into an anisotropic conductor. Thus, the electric current flows in an oblique direction 23 inclined from a direction of an electric field. When the electric field is applied in the longitudinal or axial direction 21 of the tube, the electric current flows over the tube wall in the oblique direction inclined from the direction of the electric field. Thus, the electric current flows as a spiral current. As described above, the nanotube 19 according to the second embodiment of this invention has a function of the solenoid, like the nanotube 17 described in conjunction with the first embodiment.

In both of the above-mentioned embodiments, magnetomotive force (F) is proportional to the electric current (I) and the number of turns (n) of the coil. It is possible to generate a strong magnetic field by the use of a ferromagnetic core located within the solenoid.

According to this invention, a spiral diameter of the spiral current is of the order of several nanometers. Therefore, the strong magnetic field is generated with weak current. The spiral pitch of the spiral current can be controllably varied in response to the magnitude of the stress applied to the nanotube. Specifically, by applying the stress of a greater magnitude, the spiral pitch is increased so as to generate a large magnetic field.

Next, description will be made about a manufacturing process of the nanotubes illustrated in FIGS. 2 through 5.

At first, a compound nanotube is synthesized so as to have a diameter on the order of nanometers (nm) and a spiral atomic configuration is synthesized. As a tube having a spiral atomic configuration and a nanometer-scale diameter, a carbon nanotube is known which has a microscopic cylindrical structure comprising carbon elements in the form of graphite as a fundamental structure. The carbon nanotube comprises graphite fiber of a microscopic multi-layer structure having a cylindrical shape with an outer diameter on the order of nanometers (nm) and formed by a spiral structure in which carbon elements as its elemental components are arranged in a six-ring configuration as its principal structure. The graphite fiber of a single-layer type is also known.

A method of mass-producing carbon nanotubes having a diameter of about 1.3 nm is already described in a publication (A. Thess et al, Science Vol. 273, p. 483 (1996)). In the example being described herein, the $BC_3$ nanotube and the CN nanotube are synthesized by the use of the technique similar to that described in the above-mentioned publication. In the following, the method of synthesizing each of the $BC_3$ nanotube and the CN nanotube will be described with reference to FIGS. 6A and 6B.

At first, according to the method described in the above-referenced publication (Science Vol. 273, pp. 483–487 (1996)), a graphite rod with a small amount of Ni scattered thereon and a graphite plate are arranged in a container at a short distance from each other. Next, a laser beam is irradiated onto the graphite rod. As a consequence, a gas is evaporated from the graphite rod and sprayed onto the graphite plate to grow the nanotube.

Herein, when a $BCl_3$ gas is mixed into an atmospheric gas for laser irradiation, the $BC_3$ nanotube 17 is produced. On the other hand, when an $NH_3$ gas is mixed into the atmospheric gas for laser irradiation, the CN nanotube 19 is produced. Decomposition of each gas helps the production of the compound nanotube.

Next, a metal electrode is formed on the tube wall of the nanotube 17 or 19 in order to flow the electric current and to apply mechanical stress. In order to form the metal electrode on the tube wall, use is made of vapor deposition in a vacuum.

Figure 6A:
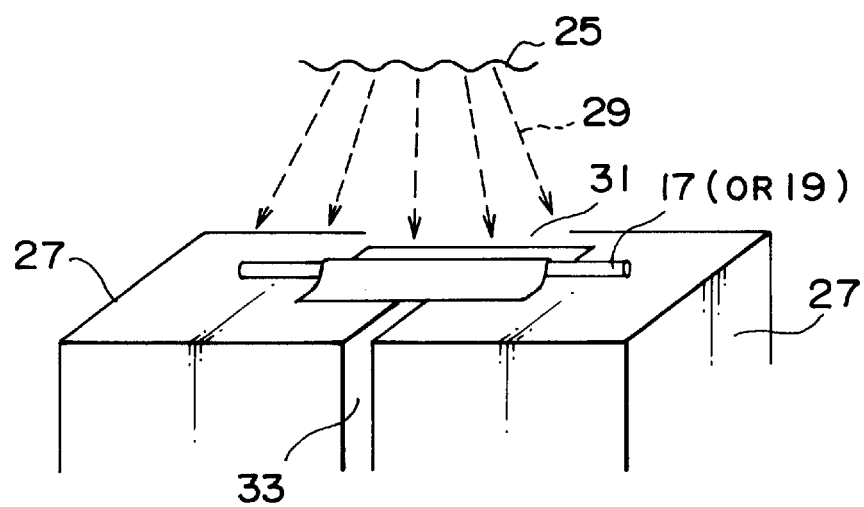
FIGS. 6A and 6B are views for describing an electrode forming process and a stress applying process for a solenoid of this invention.
Figure 6B:
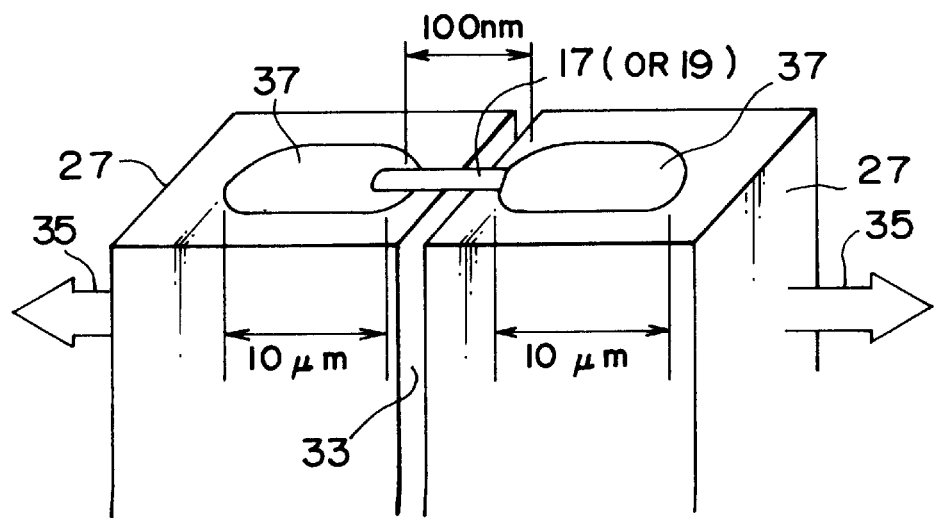

As shown in FIGS. 6A and 6B, the nanotube 17 or 19 and a metal filament 25 are put in a vacuum chamber and placed on a silicon substrate 27. The metal filament 25 is energized and heated to deposit the metal electrode on the tube wall. By heating the metal filament 25 in a vacuum, metal atoms are emitted as a metal atom beam 29 to be deposited on a surface of the nanotube 17 or 19. The nanotube 17 or 19 is partially covered with a cover 31 in an area where no metal electrode is to be formed. The substrate 27 carrying the nanotube 17 or 19 is provided with a slit 33 as shown in FIGS. 6A and 6B. When the substrate 27 is pulled in opposite directions as shown in FIG. 6B by an arrangement for applying a tensile (not shown), the stress depicted by arrows 35 can be applied to the nanotube 17 or 19.

Referring again to FIG. 6B, in order to apply the mechanical stress to the nanotube 17 or 19, a portion with the metal electrode 37 formed on the tube wall is made to have the length as long as about 100 times that having no metal electrode. This ratio is desired so that binding strength between the metal electrode 37 and the tube wall overcomes interatomic force within the tube wall.

For example, if a portion used as a coil when the electric current is made to flow through the nanotube has a length of 100 nm by an arrangement for flowing current (not shown), a 10 μm-long portion of the total length is bonded to the metal which serves as the metal electrode 37, as shown in FIG. 6B.

The force of about 0.6 dyn is required for 5% extension of the nanotube with a length of 100 nm and a diameter of 1.3 nm. The tensile deformation brings about distortion of the honeycomb-lattice atomic configuration of the tube wall, which results in anisotropy in electric conductivity. Specifically, the conductivity along the axial direction of the tube is reduced while the conductivity in a circumferential direction of the tube is increased. This is because the circumferential length is reduced by the tension. Such occurrence of the anisotropy in electric conductivity makes the electric current flow in an oblique direction inclined from the electric field. Thus, spiral electric current is generated.

Since the CN compound illustrated in FIGS. 4 and 5 is metallic, the nanotube 19 still maintains those characteristics of the metal.

On the other hand, the $BC_3$ compound shown in FIGS. 2 and 3 is a semiconductor with a band gap. Therefore, a carrier is doped to obtain the electric current. In order to introduce an electronic carrier into the $BC_3$ nanotube 17, an alkali metal is doped into the nanotube 17. A doping rate of alkali metal atoms is on the order of six thousandth (⁶/₁₀₀₀) of the number of atoms in the tube wall.

It is theoretically predicted that the doping is performed by ionic bond between the alkali metal and the tube wall. Such prediction is described by Y. Miyamoto et al in Physical Review Letters, Vol. 74, p. 2993 (1995).

A method of doping the alkali metal in the $BC_3$ nanotube will hereinafter be described. At first, the top end of the $BC_3$ nanotube is oxidized and broken to form an opening. When the top end with the opening is brought into contact with the alkali metal in a molten state, the alkali metal is introduced into the nanotube by capillary action. When the diameter of the nanotube exceeds 10 nm, the alkali metal is inhibited by its surface tension from being introduced. Therefore, the nanotube must have a diameter as small as several nanometers. It is noted here that, when the alkali metal is doped in the $BC_3$ nanotube, one electron carrier can be supplied for one alkali metal atom. Accordingly, a carrier concentration is equal to a doping concentration of alkali metal atoms.

The tube is applied with an electric field of 1V to generate the electric current of 2 microamperes and the internal magnetic field of 0.2 tesla. Thus, the magnetic field is remarkably large with respect to a small electric current. This is because the diameter of the tube is very small.

Figure 7A:
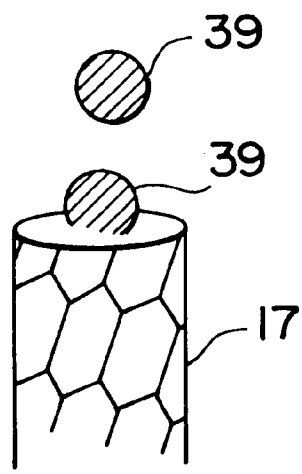
FIGS. 7A and 7B are schematic diagrams of a nanotube containing ferromagnetic metal atoms.
Figure 7B:
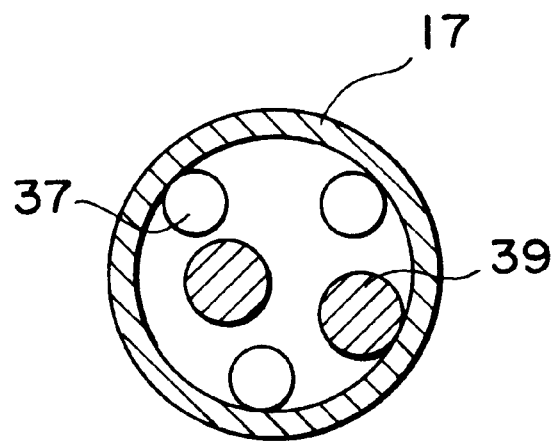

Now, description will be made as regards a method of increasing the strength of the magnetic field of the nanotube according to the first embodiment of this invention. Referring to FIGS. 7A and 7B, metal atoms 37 of a ferromagnetic material, such as iron and cobalt, may be doped inside of the nanotube 17 which has been doped with the alkali metal atoms 37 according to the above-described method. In this event, doping into the nanotube 17 can be performed by the capillary action. The ferromagnetic material is doped inside of the tube in a manner which will presently be described.

At first, the top end of the nanotube 17 is oxidized to be opened. Then, as shown in FIG. 7A, a ferromagnetic metal solution is brought into contact with the opening of the nanotube 17 to introduce the metal atoms 37 of the ferromagnetic material into the nanotube 17 as shown in FIG. 7B.

With respect to the nanotube according to the second embodiment of this invention, it is possible to increase the strength of the magnetic field by doping the metal atoms of the ferromagnetic material in the similar manner.

As described above, according to this invention, it is possible to achieve a compound nanotube of a nanometer scale, a microsolenoid, and an magnetic generating apparatus using the compound nanotube.

Furthermore, according to this invention, it is possible to generate a very large magnetic field by weak current so that an arrangement for generating a strong magnetic field can be miniaturized.

Thus, according to this invention, it is possible to achieve a reduction in scale of the electromagnetic device. Therefore, the electromagnetic device or the magnetic generating apparatus of this invention is applicable not only in heavy electric industries but also in the field of electronics.

What is claimed is:

1. A compound nanotube having a distorted configuration of atoms in a predetermined direction, wherein said nanotube comprises an elongated cylindrical physical structure and said distorted configuration of the atoms is formed spirally along a surface of the nanotube and said nanotube being applied with mechanical stress to controllably vary a current flow direction.

2. A compound nanotube as claimed in claim 1, wherein said mechanical stress is tensile stress applied in a longitudinal direction of said nanotube.

3. A compound nanotube as claimed in claim 2, wherein a ferromagnetic material is introduced in said compound nanotube.

4. A compound nanotube as claimed in claim 2, said compound nanotube comprising a semiconductor with an electron carrier doped in said compound nanotube.

5. A compound nanotube as claimed in claim 4, wherein said semiconductor is made of boron carbide.

6. A compound nanotube as claimed in claim 2, said compound nanotube being a conductor.

7. A compound nanotube as claimed in claim 6, wherein said conductor is made of carbon nitride.

8. A magnetic generating apparatus comprising a compound nanotube, means for applying a tensile stress to said compound nanotube in a longitudinal direction of said compound nanotube, and means for flowing current at both ends of said compound nanotube, wherein said current flows in a spiral direction along a surface of said compound nanotube to generate flux of magnetic field along said longitudinal direction.

9. A magnetic generating apparatus as claimed in claim 8, wherein said compound nanotube has a distorted configuration of atoms in a predetermined direction with a lower symmetry than that of an undistorted configuration.

10. A magnetic generating apparatus as claimed in claim 9, wherein said distorted configuration of the atoms is formed spirally along a surface of the nanotube.

11. A magnetic generating apparatus as claimed in claim 10, wherein said nanotube is applied with mechanical stress to controllably vary a current flow direction.

12. A magnetic generating apparatus as claimed in claim 11, wherein said mechanical stress is tensile stress applied in a longitudinal direction of said compound nanotube.

13. A magnetic generating apparatus as claimed in claim 12, wherein a ferromagnetic material is introduced in said compound nanotube.

14. A magnetic generating apparatus as claimed in claim 12, said compound nanotube comprising a semiconductor with an electron carrier doped in said compound nanotube.

15. A magnetic generating apparatus as claimed in claim 14, wherein said semiconductor is made of boron carbide.

16. A magnetic generating apparatus as claimed in claim 12, wherein said compound nanotube is a conductor.

17. A magnetic generating apparatus as claimed in claim 16, wherein said conductor is made of carbon nitride.

18. A solenoid element comprising a compound nanotube, said compound nanotube having a distorted configuration of atoms in a predetermined direction, wherein said nanotube comprises an elongated cylindrical physical structure and said distorted configuration of the atoms is formed spirally along a surface of the nanotube and said nanotube being applied with mechanical stress to controllably vary a current flow direction.

19. A solenoid element as claimed in claim 18, wherein said mechanical stress is tensile stress applied in a longitudinal direction of said nanotube.

20. A solenoid element as claimed in claim 19, wherein a ferromagnetic material is introduced in said compound nanotube.

21. A solenoid element as claimed in claim 19, said compound nanotube comprising a semiconductor with an electron carrier doped in said compound nanotube.

22. A solenoid element as claimed in claim 21, wherein said semiconductor is made of boron carbide.

23. A solenoid element as claimed in claim 19, said compound nanotube being a conductor.

24. A solenoid element as claimed in claim 23, wherein said conductor is made of carbon nitride.

25. A magnetic generating apparatus comprising;

a compound nanotube, a tensile force applicator applying a tensile force to said compound nanotube in a longitudinal direction of said compound nanotube distorting an atomic structure of said compound nanotube, and an electrical current flowing from one end of the compound nanotube to another end, wherein said electrical current flows in a spiral direction along a surface of said compound nanotube to generate a magnetic flux along said longitudinal direction.

26. A solenoid element comprising;

a compound nanotube having a distorted configuration of atoms in a predetermined direction with a lower symmetry than that of an undistorted configuration, wherein said distorted configuration is created by applying a tensional force in opposite directions at either end of said compound nanotube.

* * * * *